United States Patent
Chuang

(10) Patent No.: US 8,985,566 B2
(45) Date of Patent: Mar. 24, 2015

(54) F TYPE CLAMP HAVING A LOCKING FUNCTION

(71) Applicant: Ehoma Industrial Corporation, Taichung (TW)

(72) Inventor: Chun-Huan Chuang, Taichung (TW)

(73) Assignee: Ehoma Industrial Corporation, Taichung (TW)

( * ) Notice: Subject to any disclaimer, the term of this patent is extended or adjusted under 35 U.S.C. 154(b) by 0 days.

(21) Appl. No.: 14/019,174

(22) Filed: Sep. 5, 2013

(65) Prior Publication Data

US 2014/0165340 A1  Jun. 19, 2014

(30) Foreign Application Priority Data

Dec. 17, 2012 (TW) ............................... 101224400 U

(51) Int. Cl.
  *B23Q 1/03* (2006.01)
  *F16B 2/12* (2006.01)
  *B25B 5/06* (2006.01)

(52) U.S. Cl.
  CPC .. *F16B 2/12* (2013.01); *B25B 5/068* (2013.01)
  USPC ..................................... 269/86; 269/3; 269/6

(58) Field of Classification Search
  USPC ........... 268/143, 249, 3, 6; 269/143, 249, 3, 6
  See application file for complete search history.

(56) References Cited

U.S. PATENT DOCUMENTS

| | | | | | |
|---|---|---|---|---|---|
| 3,758,100 | A | * | 9/1973 | Taylor et al. ................... | 269/203 |
| 5,427,364 | A | * | 6/1995 | Zborschil ....................... | 269/166 |
| 7,896,323 | B2 | * | 3/2011 | Murray et al. .................. | 269/6 |
| 8,282,088 | B2 | * | 10/2012 | Janson et al. .................... | 269/6 |
| 2003/0102614 | A1 | * | 6/2003 | Foshag et al. .................. | 269/171 |
| 2005/0184439 | A1 | * | 8/2005 | Janson et al. ..................... | 269/6 |
| 2014/0165340 | A1 | * | 6/2014 | CHUANG ....................... | 24/486 |

* cited by examiner

*Primary Examiner* — Lee D Wilson
(74) *Attorney, Agent, or Firm* — Muncy, Geissler, Olds & Lowe, P.C.

(57) ABSTRACT

A F type clamp having a locking function includes a base frame including a locating frame bar and a rail, a sliding member having one end coupled to the rail and selectively set between a locking position and an unlocking position, a clamping member movably mounted at an opposite end of the sliding member and providing a jaw plate for working with the locating frame bar to hold down a workpiece, and a locking device set between the sliding member and the rail for locking the sliding member to the rail under normal conditions and for enabling the sliding member to be moved relative to the rail by an external force.

5 Claims, 8 Drawing Sheets

F TYPE CLAMP HAVING A LOCKING FUNCTION

BACKGROUND OF THE INVENTION

1. Field of the Invention

The present invention relates to clamp technology, and more particularly to an F type clamp that provides a locking function.

2. Description of the Related Art

Referring to FIGS. 1 and 2, a conventional F type clamp 1 generally comprises a rail 2, a locating frame bar 3 extended from one end of the rail 2 at right angles, a sliding bar 4 having a through hole 5 located at one end thereof and slidably coupled to the rail 2, a screw rod 6 threaded through an opposite end of the sliding bar 4, a handle 7 fixedly connected to one end of the screw rod 6, and a jaw plate 8 fixedly located at an opposite end of the screw rod 6 for working with the locating frame bar 3 to hold down a workpiece. Further, the through hole 5 tilts relative to the rail 2, defining an upper bearing point A and a lower bearing point B. Under normal conditions, the upper bearing point A and the lower bearing point B are respectively abutted against two opposite sides of the rail 2, securing the sliding bar 4 to the rail 2 in position and giving a pressure to the screw rod 6 to force the jaw plate 8 against the workpiece and the locating frame bar 3.

According to the aforesaid prior art F type clamp 1, when going to adjust the position of the sliding bar 4 relative to the rail 2, the user needs to bias the sliding bar 4 to further move the through hole 5 to a parallel manner relative to the rail 2, disengaging the upper bearing point A and the lower bearing point B from the rail 2 and allowing the sliding bar 4 to be moved freely along the rail 2. However, when the applied pressure is disappeared after the adjustment, the effect of the gravity weight of the sliding bar 4 and the screw rod 6 can cause displacement of the sliding rail 4 relative to the rail 2 for a certain distance, affecting the accuracy of the positioning of the sliding bar 4 on the rail 2. Further, if the user's hand touches the bottom side of the sliding bar 4, the sliding bar 4 can be vibrated accidentally, causing transient disengagement of the upper bearing point A and the lower bearing point B from the rail 2 and leading to downward sliding movement of the sliding bar 4 relative to the rail 2 or accidental injury. Further, accidental vibration of the F type clamp 1 or the worktable can cause transient disengagement of the upper bearing point A and the lower bearing point B from the rail 2 and displacement of the sliding bar 4 relative to the rail 2, leading to workpiece clamping failure. Improvement in this regard is necessary.

SUMMARY OF THE INVENTION

The present invention has been accomplished under the circumstances in view. It is the main object of the present invention to provide a F type clamp having a locking function, which has a locking device set between a sliding member and a rail thereof for locking the sliding member to the rail under normal conditions and for enabling the sliding member to be moved relative to the rail by an external forte for position adjustment.

To achieve this and other objects of the present invention, an F type clamp having a locking function of the present invention comprises a base frame, a sliding member, a clamping member and a locking device. The base frame comprises a locating frame bar and a rail connected at right angles. The sliding member has one end thereof selectively shifted between an unlocking position where the sliding member is movable along the rail, and a locating position where the sliding member is locked to the rail. The clamping member is movably mounted at an opposite end of the sliding member remote from the rail, comprising a jaw plate located at one end thereof for working with the locating frame bar to hold down a workpiece. The locking device is set between the sliding member and the rail for locking the sliding member to the rail under normal conditions and for enabling the sliding member to be moved relative to the rail by an external force. Thus, the invention can be used in all F type clamps, preventing displacement of the sliding member relative to the rail due to non-contact between the upper and lower bearing points of the sliding member and the rail and assuring a high level of workpiece clamping stability.

DETAILED DESCRIPTION OF THE INVENTION

Other and further advantages and features of the present invention will be understood by reference to the description of the preferred embodiment in conjunction with the accompanying drawings where the components are illustrated based on a proportion, size, amount of deformation or displacement suitable for explanation but not subject to the actual component proportion.

Figure 1:
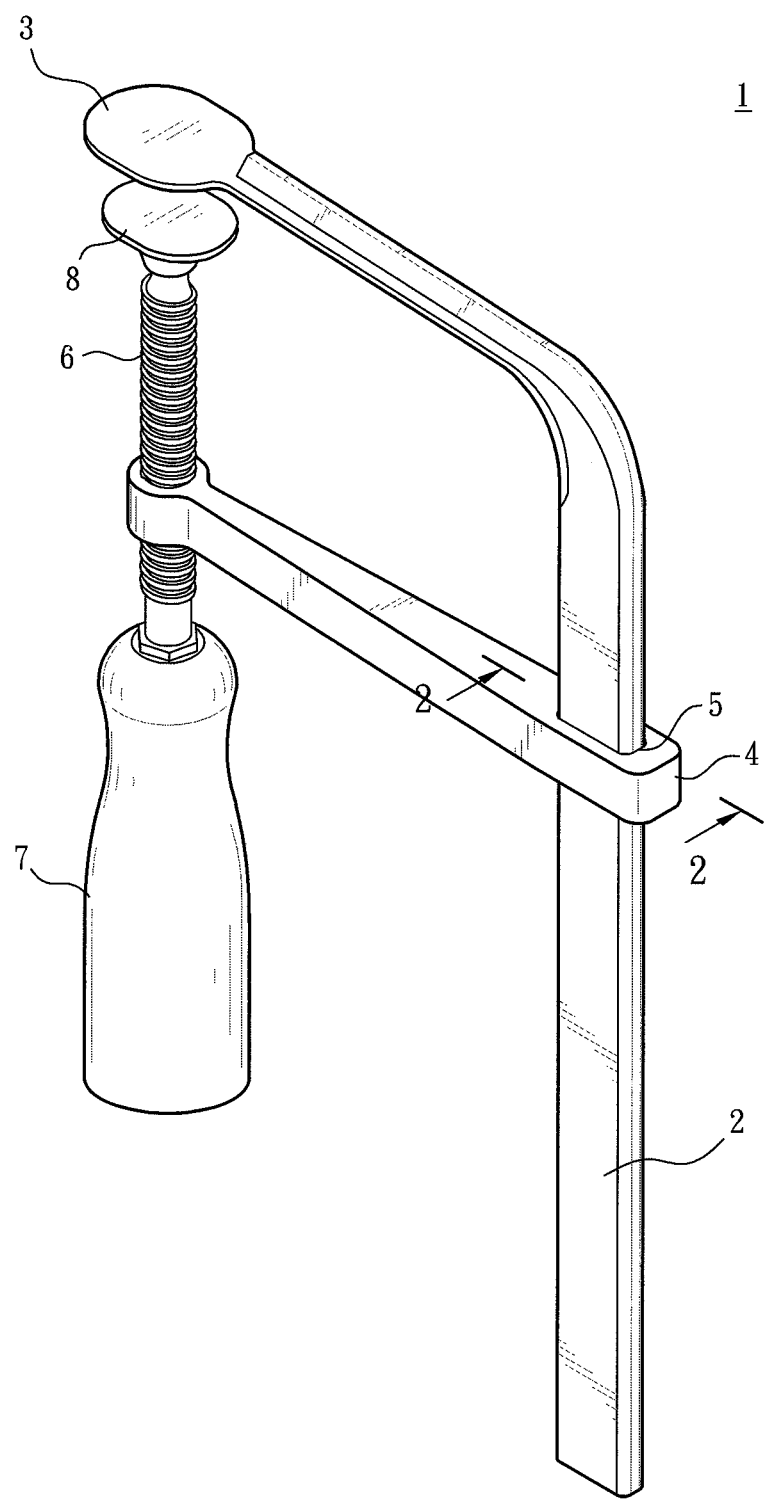
FIG. 1 is an elevational view of an F type clamp according to the prior art.
Figure 2:
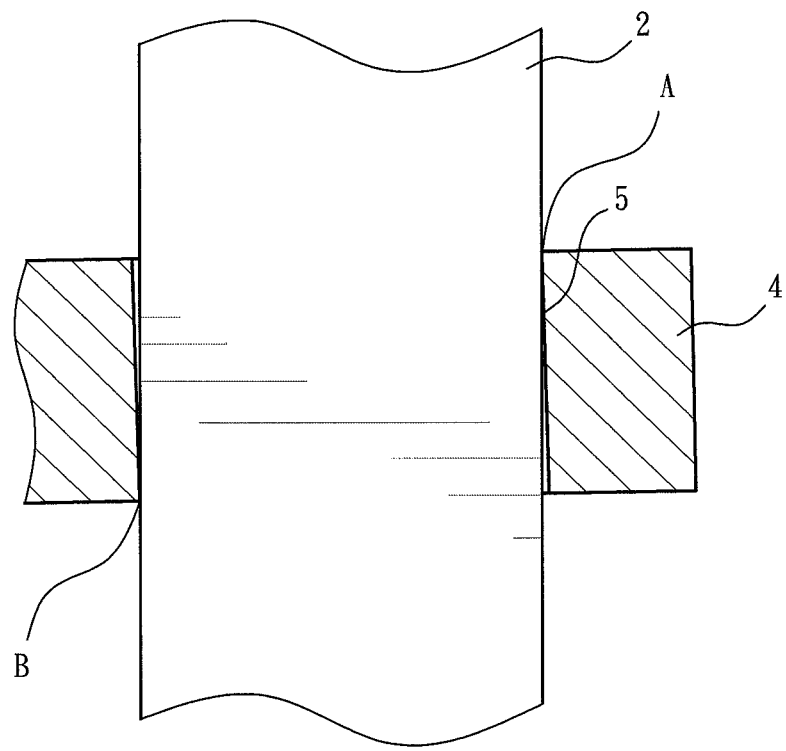
FIG. 2 is an enlarged view, partially in section, of the F type clamp shown in FIG. 1.
Figure 3:
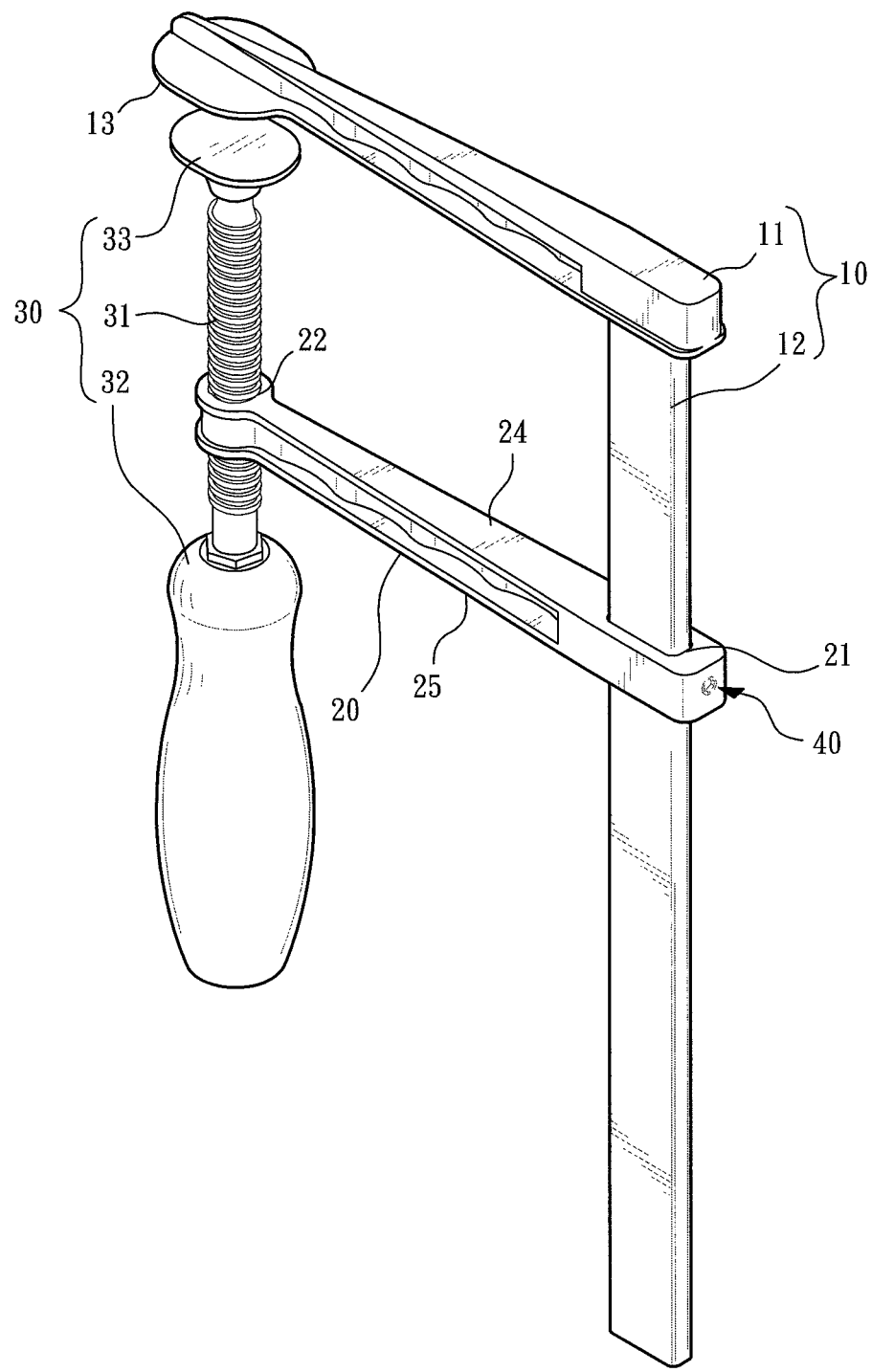
FIG. 3 is an elevational view of an F type clamp having a locking function in accordance with the present invention.
Figure 4:
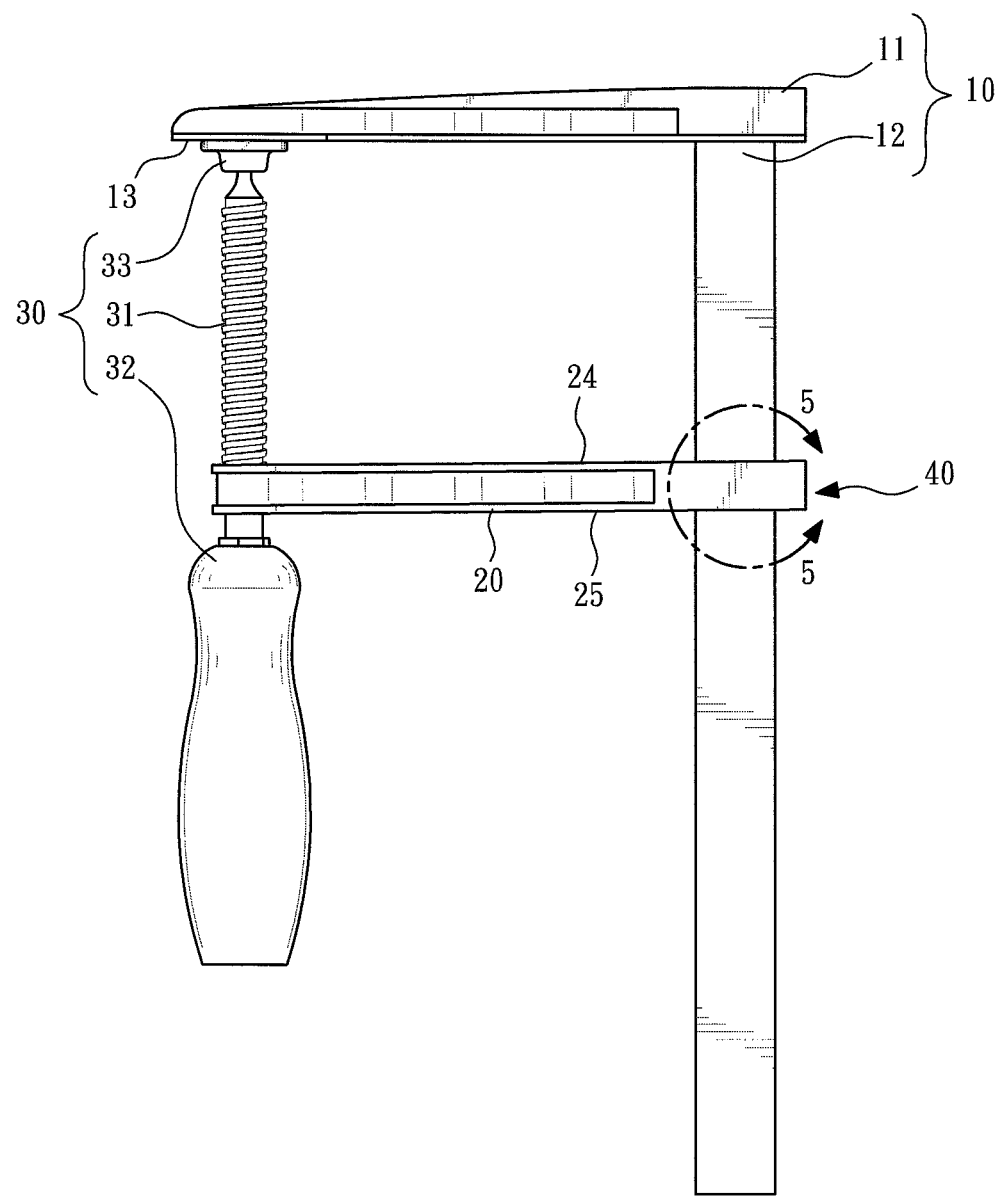
FIG. 4 is a side view of the F type clamp having a locking function in accordance with the present invention.
Figure 5:
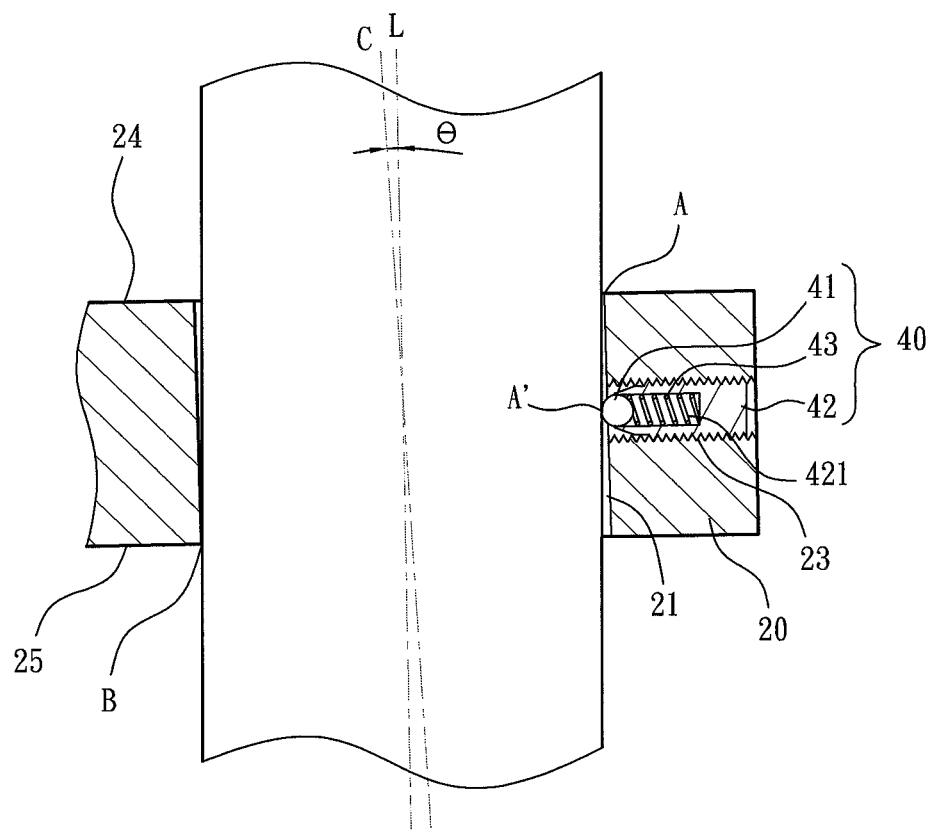
FIG. 5 is an enlarged view, partially in section, taken along line 5-5 of FIG. 4.

Referring to FIGS. 3-5, an F type clamp having a locking function in accordance with the present invention is shown. The F type clamp comprises a base frame 10, a sliding member 20, a clamping member 30 and a locking device 40.

The base frame 10 is an L-shaped frame comprising a locating frame bar 11 and a rail 12 connected at right angles. The locating frame bar 11 has its one end, namely, the fixed end fixedly connected with one end of the rail 12, and its other end, namely, the free end terminating in a clamping surface 13. The rail 12 is a substantially rectangular bar. Further, the base frame 10 defines a vertical line L extending along the length of the rail 12.

The sliding member 20 is an elongated bar comprising a first sidewall 24 facing toward the locating frame bar 11 of the base frame 10, a second sidewall 25 opposite to the first sidewall 24, a through hole 21 vertically located at one end thereof and cut through the first sidewall 24 and the second sidewall 25, a mounting screw hole 22 vertically located at an opposite end thereof and cut through the first sidewall 24 and the second sidewall 25, and a locating screw hole 23 transversely disposed in communication with the through hole 21. Further, the through hole 21 defines a central axis C that is not kept in a perpendicular manner relative to the first sidewall 24 and the second sidewall 25. The central axis C and the vertical line L define a contained angle θ within 1~2°. Thus, when the central axis C and the vertical line L are substantially superimposed (or when the central axis C and the vertical line L are substantially kept in parallel), the sliding member 20 can be moved relative to the rail 12, as shown in FIG. 5. An upper bearing point A is defined between the through hole 21 and the first sidewall 24. A to bearing point B is defined between the through hole 21 and the second sidewall 25. When the central axis C is biased relative to the vertical line L, the upper bearing point A and the lower bearing point B will be respectively stopped against two opposite sides of the rail 12, securing the sliding member 20 to the rail 12. Thus, one end of the sliding member 21 can be selectively shifted between an unlocking position where the sliding member 20 is movable along the rail 12 and a locking position where the sliding member 20 is locked to the rail 12.

The clamping member 30 comprises a screw rod 31, a handle 32, and a jaw plate 33. The screw rod 31 is threaded into the mounting screw hole 22 of the sliding member 20. The handle 32 is mounted at one end of the screw rod 31 and operable to rotate the screw rod 31 relative to the sliding member 20. The haw plate 33 is mounted at an opposite end of the screw rod 31 for working with the clamping surface 13 to clamp a workpiece.

The locking device 40 is mounted between the sliding member 20 and the rail 12, comprising a locking member 41, a screw member 42 and a spring member 43. The screw member 42 is threaded into the locating screw hole 23, defining therein an axially extending accommodation hole 421. The locking member 41 is mounted in the accommodation hole 421. The spring member 43 is set between the locking member 41 and the screw member 42 within the accommodation hole 421 to support the locking member 41, holding the locking member 41 in a locking position where the locking member 41 partially projects into the through hole 21 and stopped against an outer short side of the rail 12 remote from the clamping surface 13. Normally, under the effect of the locking device 40, a second upper bearing point A' (i.e., the locking member 41) is in action to replace the upper bearing point A, making sure that the sliding member 20 is positioned on the rail 12 subject to engagement between the second upper bearing point A' and lower bearing point B and the sliding member 20. Thus, if the clamp is vibrated, the elastic resilience of the locking device 40 keeps the second upper bearing point A' and lower bearing point B in positive engagement with the sliding member 20. Similarly, when the technical features of the present invention are employed to different design of clamp means, the elastic resilience of the locking device 40 prevents disengagement of the second upper bearing point A' from the rail 12. Further, during an adjustment operation of the present invention, the elastic resilience of the locking device 40 enables the locking member 41 to be moved backward by an external pressure for allowing adjustment of the position of the sliding member 20 relative to the rail 12. Further, in this embodiment, the locking member 41 is a steel ball; the screw member 42 works as adjustment means for allowing adjustment of the pressure applied by the locking member 41 to the rail 12.

Under normal conditions (no pressure is applied to the sliding member 20), the sliding member 20 is prohibited from displacement relative to the rail 12 subject to engagement between the second upper bearing point A' and lower bearing point B and the sliding member 20. At this time, the elastic resilience of the locking device 40 forces the locking member 41 to stop against the outer short side of the rail 12, locking the sliding member 20 to the rail 12. Thus, under normal conditions, the sliding member 20 is positively locked to the rail 12, preventing accidental loosening of the workpiece or accidental injury of the operator.

Figure 6:
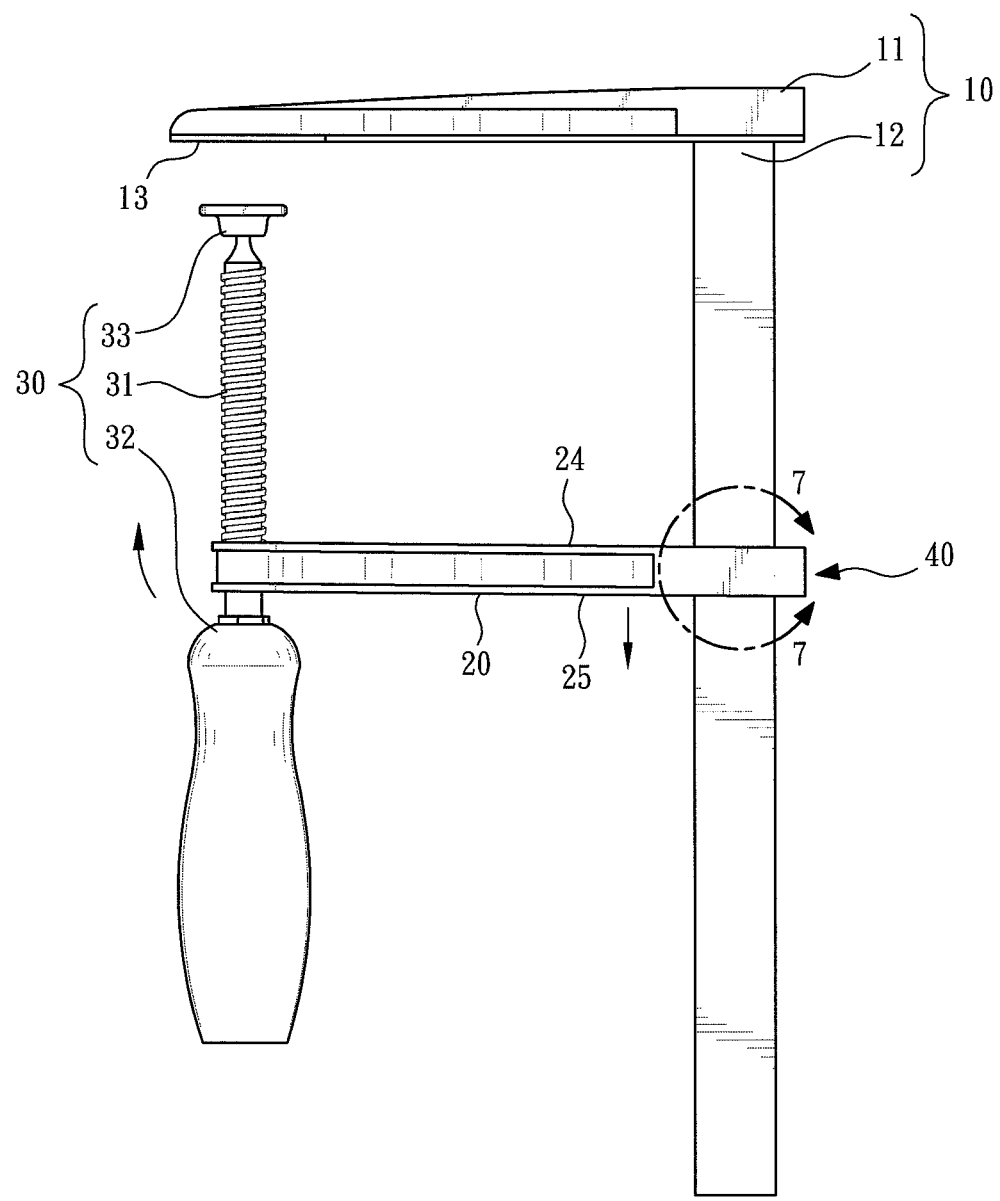
FIG. 6 is a schematic drawing of the present invention illustrating an adjustment operation of the F type clamp having a locking function.
Figure 7:
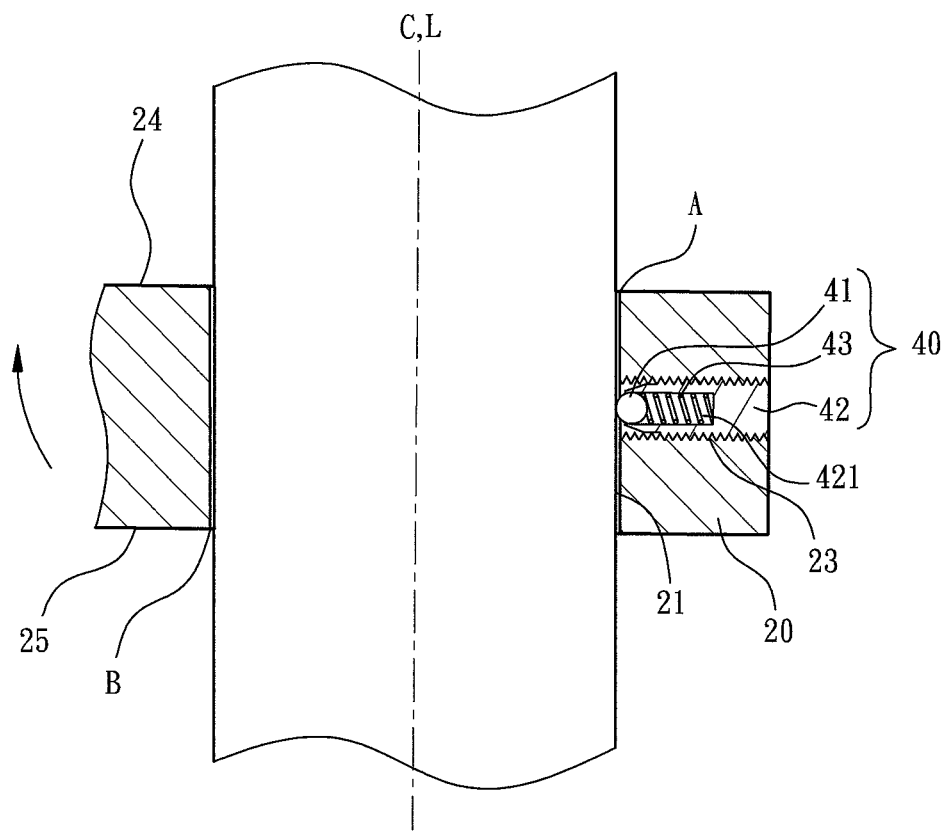
FIG. 7 is an enlarged view, partially in section, taken along line 7-7 of FIG. 6.

Referring to FIGS. 6 and 7, when going to adjust the position of the sliding member 20 relative to the rail 12, for example, when going to adjust the sliding member 20 to a position far from or close to the locating frame bar 11, apply an upward pressure to the sliding member 20 to superimpose the central axis C and the vertical line L and to further disengage the upper bearing point A and lower bearing point B from the rail 12, allowing movement of the sliding member 20 relative to the rail 12. It is to be noted that the locking device 40 is mounted in the sliding member 20 corresponding the outer short side of the rail 12 remote from the clamping surface 13, and therefore lifting the sliding member 20 can force the locking member 41 to move in direction away from the rail 12, facilitating quick displacement of the sliding member 20 relative to the rail 12.

Figure 8:
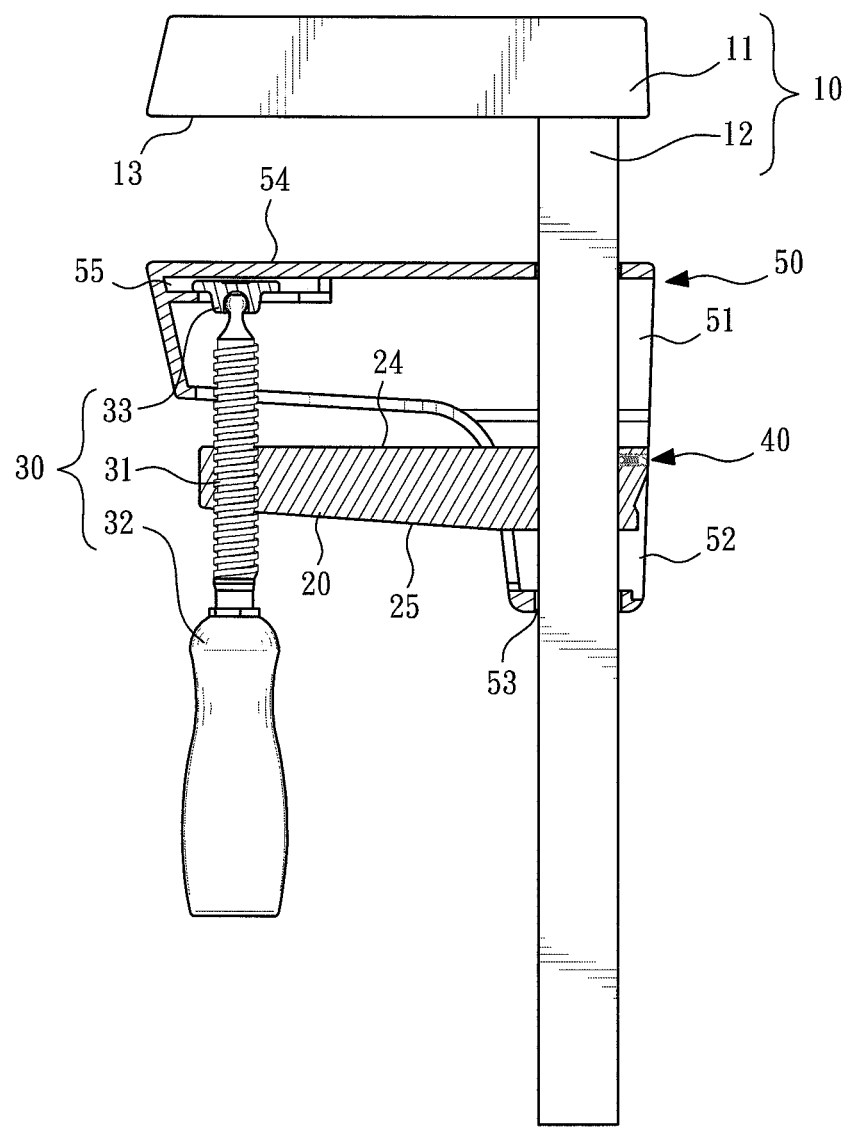
FIG. 8 is a schematic side view, partially in section, of an alternate form of the F type clamp having a locking function in accordance with the present invention.

Referring to FIG. 8, an alternate form of the F type clamp having a locking function in accordance with the present invention is shown. This alternate form is substantially similar to the embodiment shown in FIGS. 1-7 with the exception that this alternate form further comprises a support member 50 coupled between the rail 12 and the sliding member 20 and movable with the sliding member 20 relative to the rail 12. The support member 50 is an angle bar comprising a horizontal upper part 51, a vertical lower part 52 perpendicularly located at one end of the horizontal upper part 51, a mounting hole 53 coupled to the rail 12, a clamping surface 54 located at an upper wall of the horizontal upper part 51 remote from the vertical lower part 52 and facing toward the clamping surface 13 of the locating frame bar 11, and a mounting groove 55 disposed in the horizontal upper part 51 at an inner side relative to the clamping surface 54 for accommodating the jaw plate 33 of the clamping member 30. The broad clamping surface 54 of the support member 50 works with the clamping surface 13 of the locating frame bar 11 to hold down the workpiece steadily.

In generally, the F type clamp having a locking function of the present invention has a spring-loaded locking device set between the rail and the sliding member so that an upper bearing point A' and lower bearing point B of the sliding member are positively kept in engagement with the rail under normal conditions, preventing displacement of the sliding member relative to the rail and assuring a high level of workpiece clamping stability.

Therefore, the invention can be used in all F type clamps, preventing displacement of the sliding member relative to the rail due to non-contact between the upper and lower bearing points of the sliding member and the rail and assuring a high level of workpiece clamping stability.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. An F type clamp, comprising:
a base frame comprising a locating frame bar and a rail connected at right angles;
a sliding member having one end thereof selectively shifted between an unlocking position where said sliding member is movable along said rail and a locating position where said sliding member is locked to said rail, said sliding member further comprising a locating screw hole disposed in communication with said through hole;

a clamping member movably mounted at an opposite end of said sliding member remote from said rail, said clamping member comprising a jaw plate located at one end thereof for working with said locating frame bar to hold down a workpiece; and a locking device set between said sliding member and said rail for locking said sliding member to said rail under normal conditions and for enabling said sliding member to be moved relative to said rail by an external force, said locking device comprising a spring-loaded locking member and a screw member with said spring-loaded locking member elastically stopped against an outer short side of said rail remote from said clamping member, and said screw member threaded in said locating screw hole and stopped at one end of said spring-loaded locking member against said rail, said screw member of said locking device further defining an accommodation hole in one end thereof for accommodating said locking member; said locking device further comprises a spring member accommodated in said accommodation hole and stopped between said locking member and said screw member.

2. The F type clamp as claimed in claim 1, wherein said clamping member further comprises a handle, and a screw rod threaded through the opposite end of said sliding member remote from said rail and connected between said handle and said jaw plate.

3. The F type clamp as claimed in claim 1, further comprising a support member coupled between said rail and said sliding member and movable with said sliding member relative to said rail, said support member comprising a mounting hole located at one end thereof and slidably coupled to said rail and a mounting groove located at an opposite end thereof for accommodating said jaw plate for enabling said support member and said locating frame bar to hold down a workpiece.

4. An F type clamp, comprising:

a base frame comprising a locating frame bar and a rail connected at right angles;

a sliding member having one end thereof selectively shifted between an unlocking position where said sliding member is movable along said rail and a locating position where said sliding member is locked to said rail, said sliding member further comprising a locating screw hole disposed in communication with said through hole;

a clamping member movably mounted at an opposite end of said sliding member remote from said rail, said clamping member comprising a jaw plate located at one end thereof for working with said locating frame bar to hold down a workpiece; and a locking device set between said sliding member and said rail for locking said sliding member to said rail under normal conditions and for enabling said sliding member to be moved relative to said rail by an external force, said locking device comprising a spring-loaded locking member and a screw member, with said spring-loaded locking member elastically stopped against an outer short side of said rail remote from said clamping member, and said screw member threaded in said locating screw hole and stopped at one end of said spring-loaded locking member against said rail, said screw member of said locking device further defining an accommodation hole in one end thereof for accommodating said locking member; said locking device further comprises a spring member accommodated in said accommodation hole and stopped between said locking member and said screw member, wherein said base frame further defines a vertical line extending along the length of said rail; said sliding member further comprises a first sidewall, a second sidewall opposite to said first sidewall, and a through hole cut through said first sidewall and said second sidewall for the passing of said rail, said through hole defining a central axis, said central axis defining with said vertical line a predetermined contained angle larger than zero angle so that said sliding member is unlocked from said rail and movable relative to said rail when said central axis and said vertical line are superimposed or kept in parallel, or locked to said rail when said central axis is biased relative to said vertical line.

5. The F type clamp as claimed in claim 4, wherein said contained angle is in the range of 1~2°.

* * * * *